United States Patent
Wong

(10) Patent No.: US 10,901,706 B1
(45) Date of Patent: Jan. 26, 2021

(54) PARTIALLY IMMUTABLE MODEL

(71) Applicant: BUSINESS OBJECTS SOFTWARE LTD., Dublin (IE)

(72) Inventor: Johnson Wong, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 0 days.

(21) Appl. No.: 16/540,413

(22) Filed: Aug. 14, 2019

(51) Int. Cl.
*G06F 8/35* (2018.01)
*G06F 9/54* (2006.01)
*G06F 16/901* (2019.01)
*G06F 9/445* (2018.01)

(52) U.S. Cl.
CPC ............ *G06F 8/35* (2013.01); *G06F 9/44589* (2013.01); *G06F 9/54* (2013.01); *G06F 16/9027* (2019.01)

(58) Field of Classification Search
CPC .......... G06F 8/35; G06F 9/44589; G06F 9/54; G06F 16/9027
See application file for complete search history.

(56) References Cited

U.S. PATENT DOCUMENTS

| | | | |
|---|---|---|---|
| 6,292,803 B1* | 9/2001 | Richardson | G06F 16/252 707/610 |
| 8,881,122 B1* | 11/2014 | Klimek | G06F 8/436 717/140 |
| 2004/0243571 A1* | 12/2004 | Judd | G06F 16/2365 |
| 2011/0167088 A1* | 7/2011 | Warren | G06F 8/4434 707/781 |
| 2015/0356207 A1* | 12/2015 | Reitman | G06F 30/15 703/1 |

* cited by examiner

*Primary Examiner* — S. Sough
*Assistant Examiner* — Stephen D Berman
(74) *Attorney, Agent, or Firm* — Buckley, Maschoff & Talwalkar LLC

(57) ABSTRACT

A system includes determination of a component state tree of an application, determination of a node of the component state tree, where all child nodes of the node have been refactored to comprise an immutable model, determination of a consumer component associated with invalid access to a state of the node, and modification of the access to the state of the node by the consumer component.

15 Claims, 13 Drawing Sheets

PARTIALLY IMMUTABLE MODEL

BACKGROUND

Large and complex software applications often exhibit poor state management. Poor state management may result in poorly-defined state for a component, which may in turn cause the spread of redundant copies and/or slightly-modified copies throughout the code base. These copies lead to inefficient resource consumption, since processing thereof consumes processor cycles and storage thereof consumes memory.

Poor state management may also allow non-serializable values such as functions to be attached to state, which blurs the boundary between state and behavioral logic. Under poor state management, access to component state is loosely-controlled, leading to inadvertent side effects for consumers and error-prone code which eventually loses maintainability and the ability to provide certain features (e.g., undo/redo) which require good state management.

Conventional application development may involve hundreds of developers, each having different backgrounds and levels of experience, as well as time-constrained development cycles. Accordingly, even if development of an application is initially based on a suitable state management pattern, external effects may cause the application to eventually drift away from the desired pattern.

Good state management generally specifies well-defined centralized component state and controlled access to component state via designated application programming interface(s). Although suitable state management patterns exist, they are conventionally applicable only to the development of new applications or of applications which are to be entirely re-written. Systems are needed to incrementally refactor an existing code base so as to incorporate good state management into the code base, while substantially maintaining application functionality throughout the refactoring process.

DETAILED DESCRIPTION

The following description is provided to enable any person in the art to make and use the described embodiments and sets forth the best mode contemplated for carrying out some embodiments. Various modifications, however, will be readily-apparent to those in the art.

According to some embodiments, improved state management is incrementally achieved via a partially immutable model supporting flexible enforcement of access to component state. The foregoing may allow individual pieces of state to be incrementally refactored while preventing regression, maintaining existing functionality and allowing continued application development. Some embodiments may result in an application which is more maintainable, exhibits more efficient processor and memory utilization, and/or facilitates the development of features such as undo/redo that are difficult or impossible to implement in a robust and maintainable manner in an application having poor state management.

According to the software development pattern discussed herein, software components of an application consist of state, user interface code and application logic. State may be represented by a JavaScript Object Notation (JSON) object, while the user interface code may conform to a substantially declarative language (e.g., HTML, CSS) so as to render what state indicates. The application logic of a component determines the state at any point in time.

Generally, JSON objects can be created and read by any component, and properties thereof can be dynamically added/removed/modified without any central control. For example, a component may copy every node and link of a state tree of another component and modify the copy. These characteristics impact maintainability, processor usage and memory usage.

Figure 1:
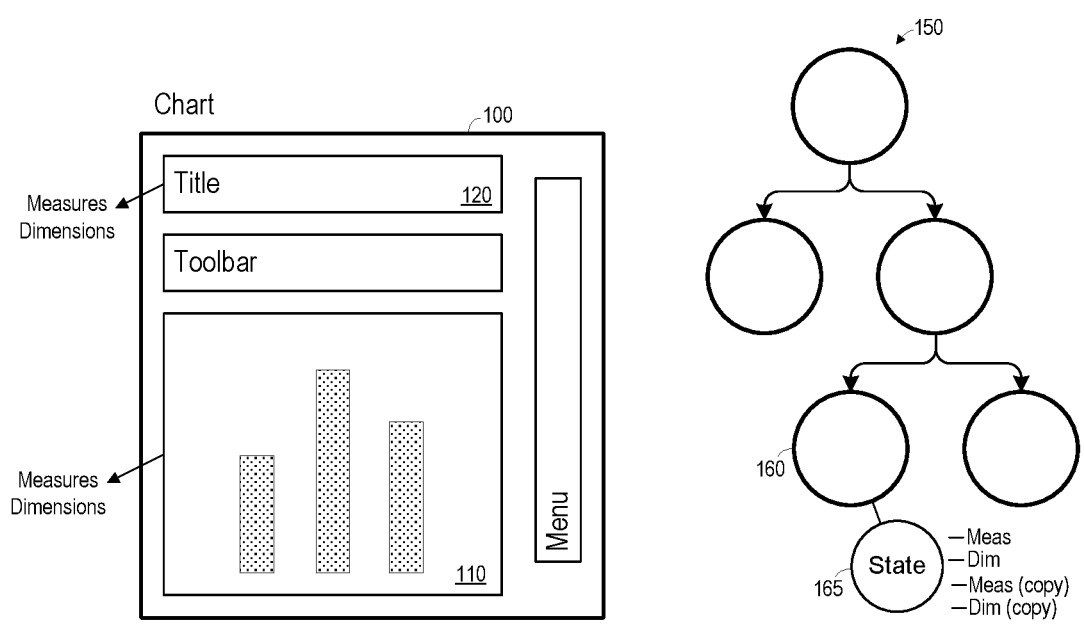
FIG. 1 illustrates a chart component and a component state tree to demonstrate suboptimal application state management.

FIG. 1 depicts chart component 100 according to some embodiments. Chart component 100 includes visualization element 110 and title element 120. Visualization element 110 references measures and dimensions defined in the state of chart 100. Title element 120 also references measures and dimensions defined in the state of chart 100, but references a different copy of the measures and dimensions than that referenced by visualization element 120.

Component tree 150 illustrates the foregoing. Node 160 represents chart component 100 and has been expanded to show underlying node 165 representing state of component 100. Node 165 includes state corresponding to measures and dimensions on certain axes and to some filters (and to data in the runtime case), and this state is referenced by visualization element 110. Node 165 also includes a copy of the state corresponding to measures and dimensions, and this copied state is referenced by title element 120. The existence of the copied state is inefficient in terms of processor and memory consumption as described above. Moreover, the copied state decreases maintainability by reducing control and understanding of overall state and changes to state.

Figure 2:
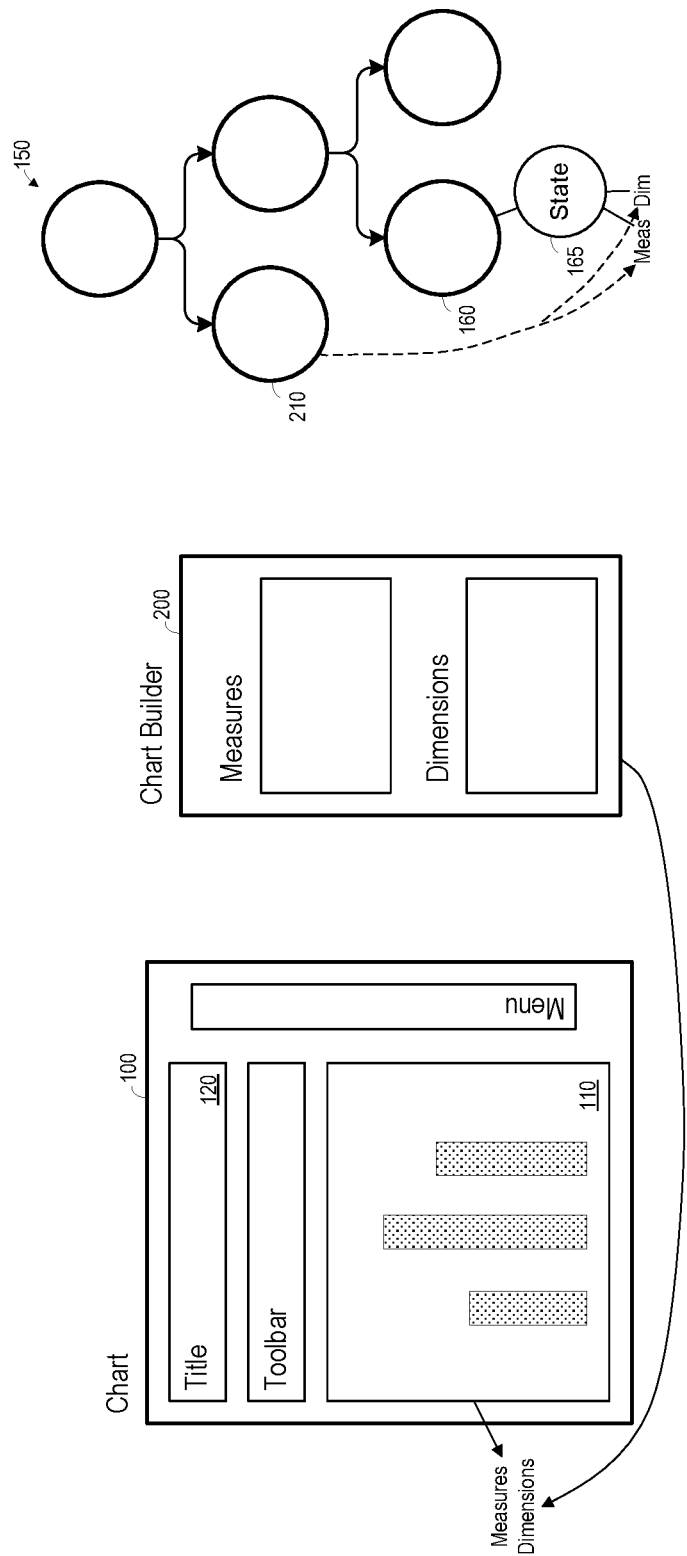
FIG. 2 illustrates a chart component, a chart builder component and a component state tree to demonstrate suboptimal application state management.

FIG. 2 again depicts chart component 100, in which visualization element 110 references measures and dimensions defined in the state of chart 100. FIG. 2 also depicts chart builder component 200, which directly references the measures and dimensions defined in the state of chart 100. Component tree 150 includes node 210 representing chart builder component 200 and illustrates a direct reference from node 210 of chart builder component 200 to the measures and dimensions of state 165. These direct references may cause problems if, for example, the measures and dimensions of state 165 are modified. Moreover, component 210 may copy or modify the referenced state within its own state, hindering control over and knowledge of overall application state.

Some embodiments utilize references, or pointers, to achieve efficient processor and memory usage. By manipulating pointers within an immutable model, new state structures may be quickly built from existing state structures without modifying or creating copies of the existing state structures.

Embodiments therefore provide migration from a mutable model (i.e., all read/write operations to such a model always operate on the same Object reference) to an immutable model (i.e., all write operations result in a new shallow snapshot of the Object and read/write operations operate on the latest snapshot of the Object). Since these snapshots are constructed through object reference updates, operations are both processor and memory efficient with a complexity that typically scales to $O(lg(n))$, where n is the number of nodes in the model.

Figure 3:
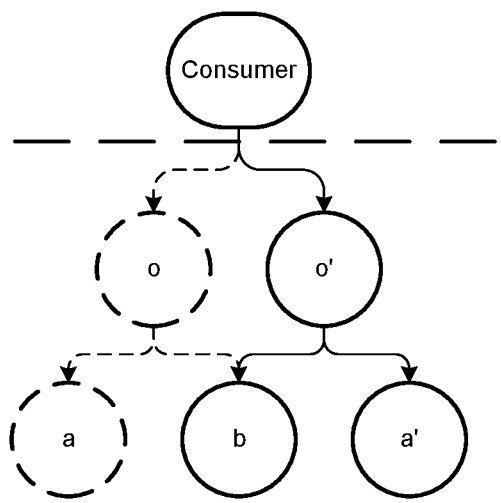
FIG. 3 illustrates pointer manipulation to create a new snapshot of an immutable model.

FIG. 3 illustrates a simple example of the above mechanism. The horizontal dashed line represents the boundary between state and state consumers. Dashed nodes indicate nodes that are strictly part of an old state snapshot, while solid nodes constitute a new snapshot.

According to the example, object o includes properties a=1 and b=2. A new object reference o' is constructed, which is the same as o but in which property a has been updated from 1 to 2. As a result, and as shown in FIG. 3, a has been updated to a' and o' is the pointer to the new snapshot of the state. Advantageously, b is not copied as part of the process of creating o'.

Figure 4:
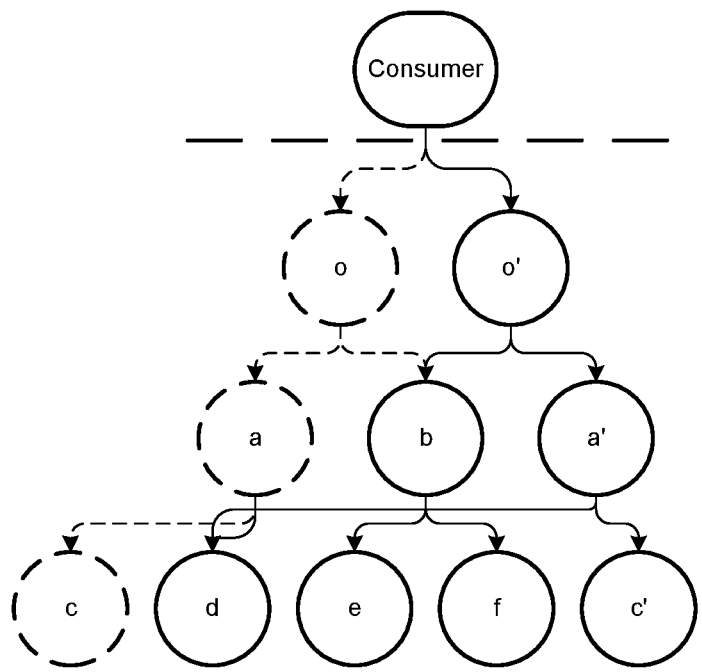
FIG. 4 illustrates pointer manipulation to create a new snapshot of an immutable model.

Similar principles can be applied to larger and more complex objects. After each change to the model, the original object (or snapshot) is never modified, and is therefore considered immutable. The new snapshot is built up of pointers to the old snapshot, with the only modification being a pointer to the changed value. FIG. 4 is similar to FIG. 3 but includes an additional level. More specifically, c is updated to c' and results in a new snapshot o'. Notably, the update does not require copying of b, d, e, and f Only the path leading to the modified value is created, resulting in the above-mentioned $O(lg(n))$ complexity.

Figure 5:
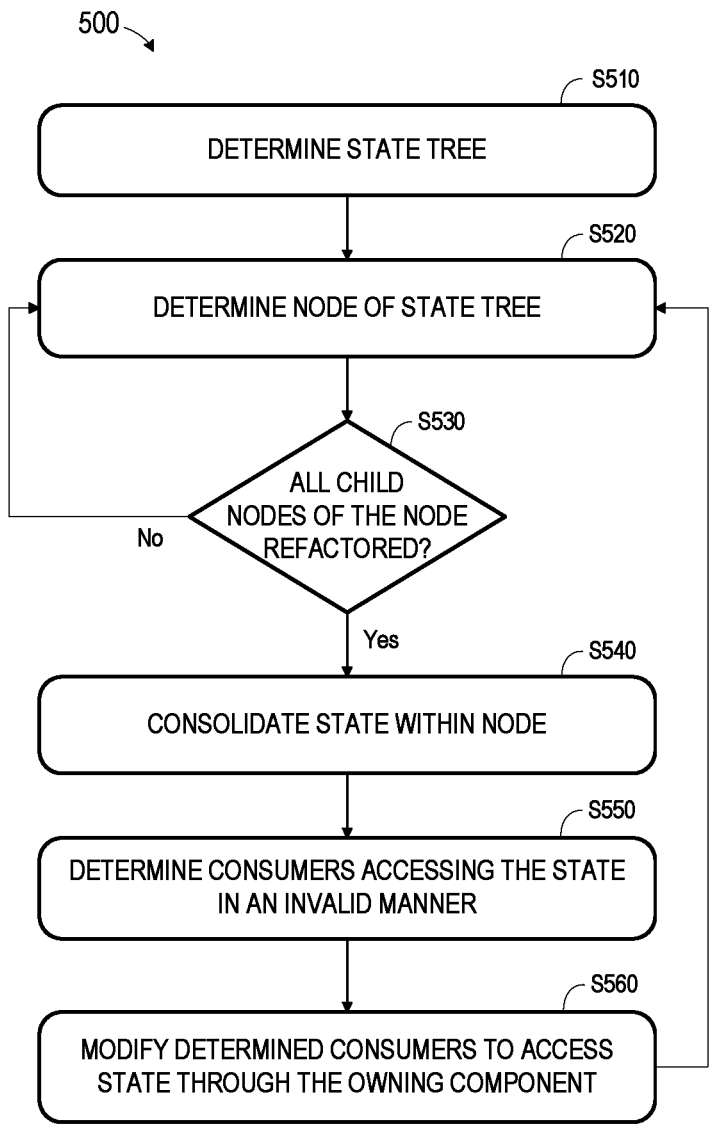
FIG. 5 is a flow diagram of a process to create a partially immutable model according to some embodiments.

FIG. 5 comprises a flow diagram of process 500 according to some embodiments. In some embodiments, various hardware elements of a computing system, such as a development system, execute program code to perform process 500. Process 500 and all other processes mentioned herein may be embodied in computer-executable program code read from one or more of non-transitory computer-readable media, such as a hard disk drive, a volatile or non-volatile random-access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 500 is initiated in order to refactor application components to provide a partially immutable model, in which various subsets of the component state tree exhibit model immutability while others do not. As described above, process 500 facilitates incremental adoption of model immutability while still allowing usage and development of the application. Accordingly, process 500 may be performed with respect to any component according to any development sequence or schedule.

Figure 6A:
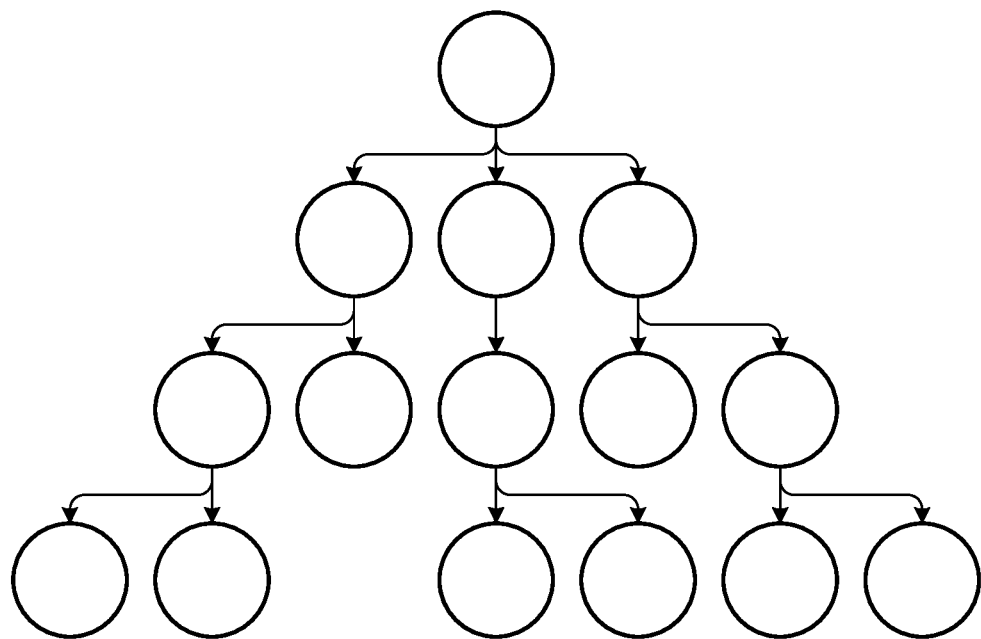
FIGS. 6A through 6D illustrate incremental refactoring of component state tree nodes to generate respective partially immutable models according to some embodiments.

Initially, at S510, a component state tree is determined. The state tree may be determined using an integrated application development environment as is known. FIG. 6A illustrates an example component state tree which will be used in the foregoing description of process 500.

Figure 6B:
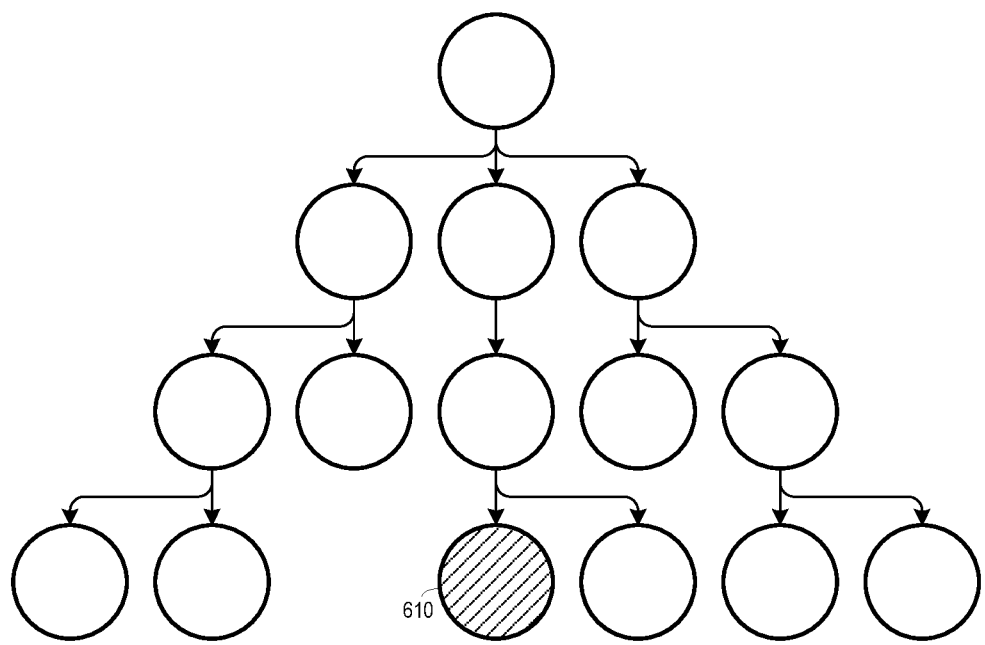

A node of the state tree is determined at S520. The determined node is a node that is intended to be refactored according to some embodiments. FIG. 6B illustrates node 610 which may be determined according to an example of S520.

At S530, it is determined whether the determined node is eligible for refactoring. The determination at S530 consists of determining whether all child nodes of the determined node have already been refactored according to some embodiments. In the case of node 610, no child nodes exist so the determination at S530 is affirmative and flow proceeds to S540.

At S540, state within the node is consolidated. Consolidation may include consolidation of two or more copies of state into a single copy. For example, the measures and dimensions referred to with respect to node 165 above may be consolidated into a single copy, and each of visualization 110 and title 120 may be re-configured to reference the single copy.

Next, at S550, all consumers accessing the state in an invalid manner are determined. Such consumers are those which read and/or write state without going through a designated Application Programming Interface of the model. In this regard, consumers typically access state through a model which points to a JSON object representing the state. Modifications to state cause updates to the pointers of the model API, so a good consumer ensures correct model access simply by utilizing the model API.

Figure 7:
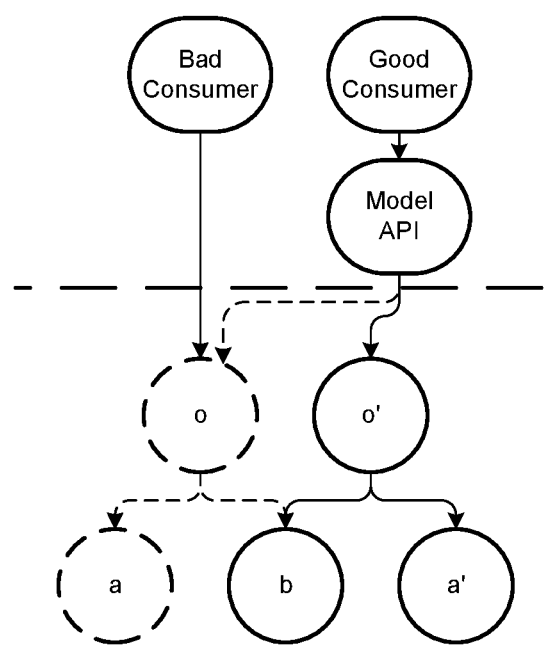
FIG. 7 illustrates invalid access to component state within a partially immutable model according to some embodiments.

A faulty, or bad, consumer accesses state through a pointer rather than the model API. FIG. 7 illustrates a bad consumer that does not access state through a designated model API and instead directly holds a reference to the model state. After a new snapshot (i.e., solid-lined nodes) is created, the bad consumer's reference is invalid and should not be used. In this specific example, attempted access to o.a by the bad consumer using its direct reference would return the old value of a and not the value of a'. Conversely, since the pointer in the model API is updated to o', the good consumer would read from the latest snapshot.

Bad consumers may be determined at S550 by identifying accesses to any prior snapshot of the state tree. For example, JavaScript mechanisms such as Object.defineProperty or Proxy, which instrument and wrap property reads and writes, may be utilized to watch nodes of the state tree which are known to be invalid. In some embodiments, the application is modified to use these APIs to detect invalid access and to log the access so the bad consumers may be later addressed by a developer at S560.

Figure 8:
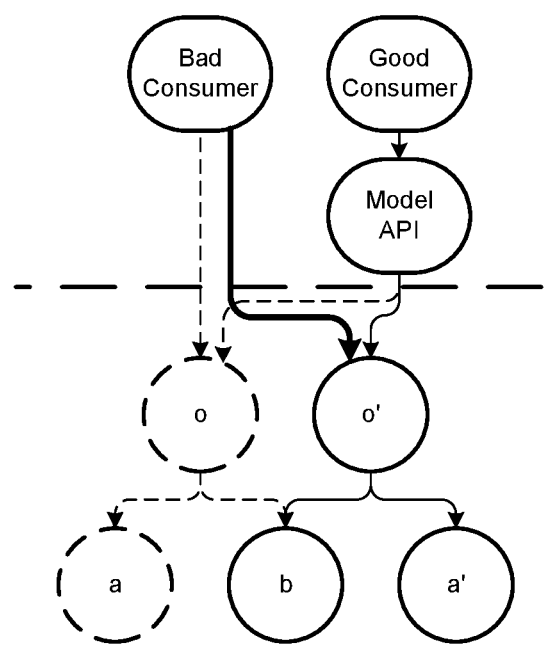
FIG. 8 illustrates invalid access modification within a partially immutable model according to some embodiments.

In this regard, the consumers determined at S550 (i.e., the "bad consumers") are modified at S560 to access state within the node through the corresponding (i.e., "owning") component. In applications where state boundaries are not well-defined, it is common for one component's (e.g., a Producer) state tree to be directly referenced by other components (e.g., Consumers). Some embodiments of S550 allows those references to exist but explicitly update the references in response to updates to the Producer state tree. FIG. 8 illustrates modification of the bad consumer of FIG. 7 to explicitly update its reference in response to creation of a new snapshot. The updated reference is denoted by the thick arrow.

This update may be performed by providing a callback to the Producer which can be invoked in response to Producer state changes. For example:

```
// Consumer has a pointer directly accessing producer state
let pointer = producer.state;
// Consumer creates a callback that will update its pointer when invoked
const cb = (newPointer) => {
    pointer = newPointer;
};
// Consumer passes callback to producer
producer.setStateChangeCallback(cb);
```

This update can be applied against any references to any part of the Producer state tree. Consequently, invalid access enforcement can be constrained to a subset of the different ways to access the Producer state tree. For example, there may be two types of bad consumers of Producer state—consumers for which invalid access is unacceptable and must be fixed and enforced, and consumers for which invalid access is acceptable in the interim and can be fixed later. If the callback mechanism is used in the latter case, such consumers will always read the latest snapshot of the Producer's state tree, which provides immutability while not requiring all consumers to be refactored at the same time in order to remain functionally correct. These latter consumers can then be incrementally refactored to access the Producer state tree through its designated model API, which will eventually remove the need to explicitly update the consumer references to the Producer state tree.

Figure 9:
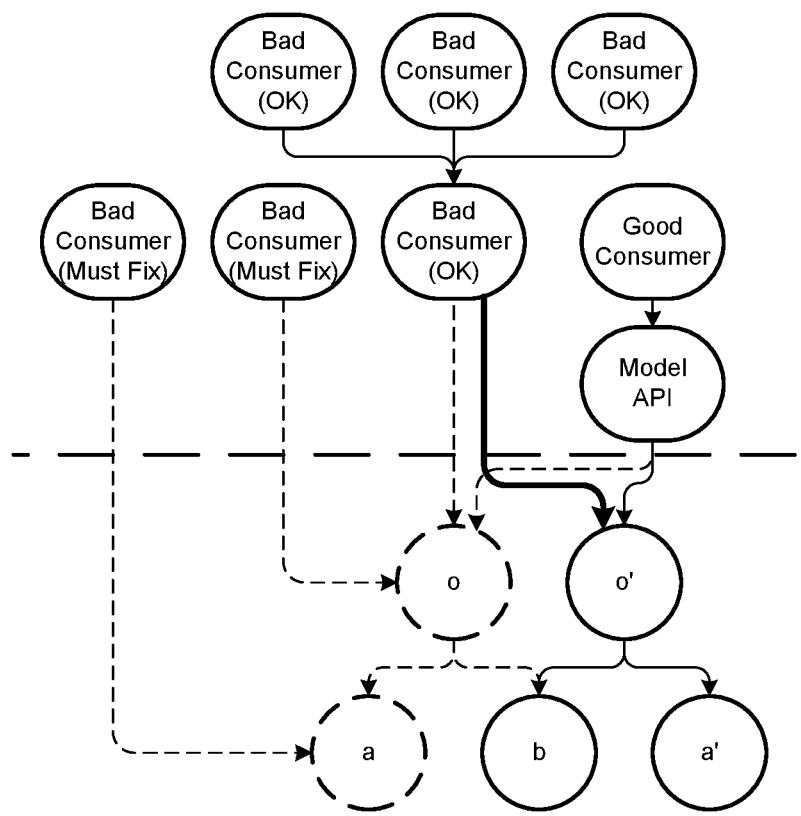
FIG. 9 illustrates invalid access modification within a partially immutable model according to some embodiments.
Figure 10:
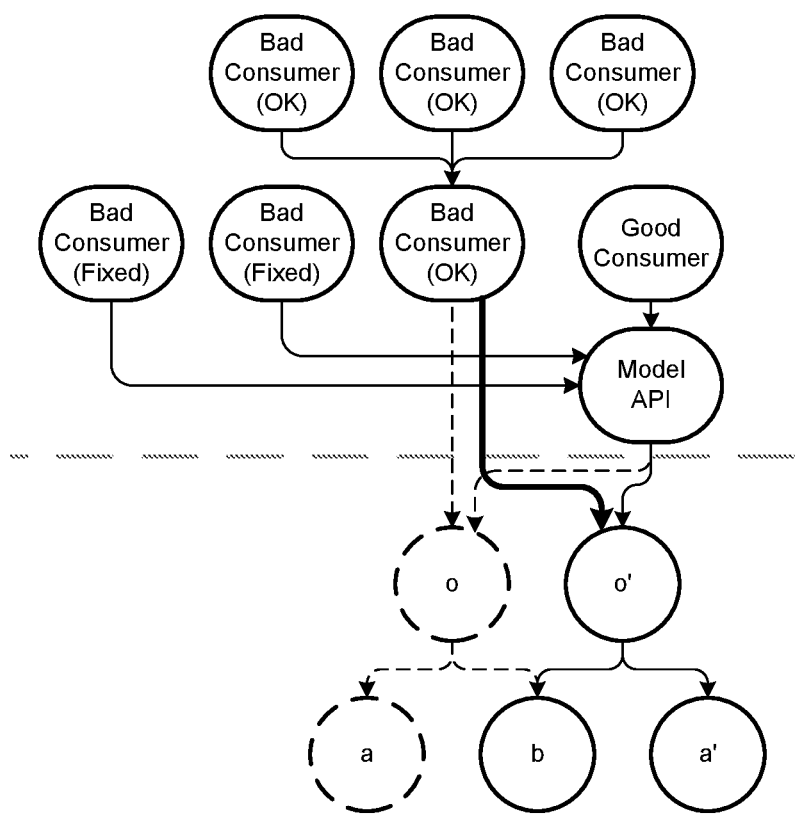
FIG. 10 illustrates invalid access modification within a partially immutable model according to some embodiments.

FIG. 9 illustrates consumers that must be fixed (for any reason) and those that are acceptable in the interim. In this example, three bad consumers are reading the pointer held by another bad consumer. Since the pointer is being updated using the callback mechanism described above, these three bad consumers do not need to be refactored immediately. In contrast, the pointers held by the two bad consumers on the left of the diagram are not updated so must be fixed. These pointers may be fixed using the callback mechanism or by modifying the consumers to point to the model API of the component, as shown in FIG. 10.

Figure 6C:
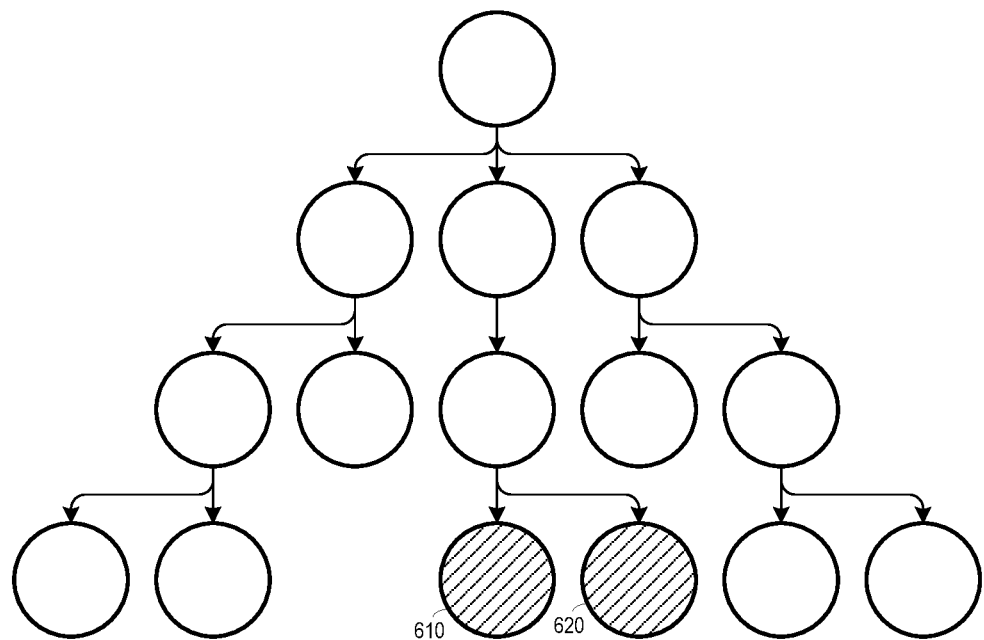
Figure 6D:
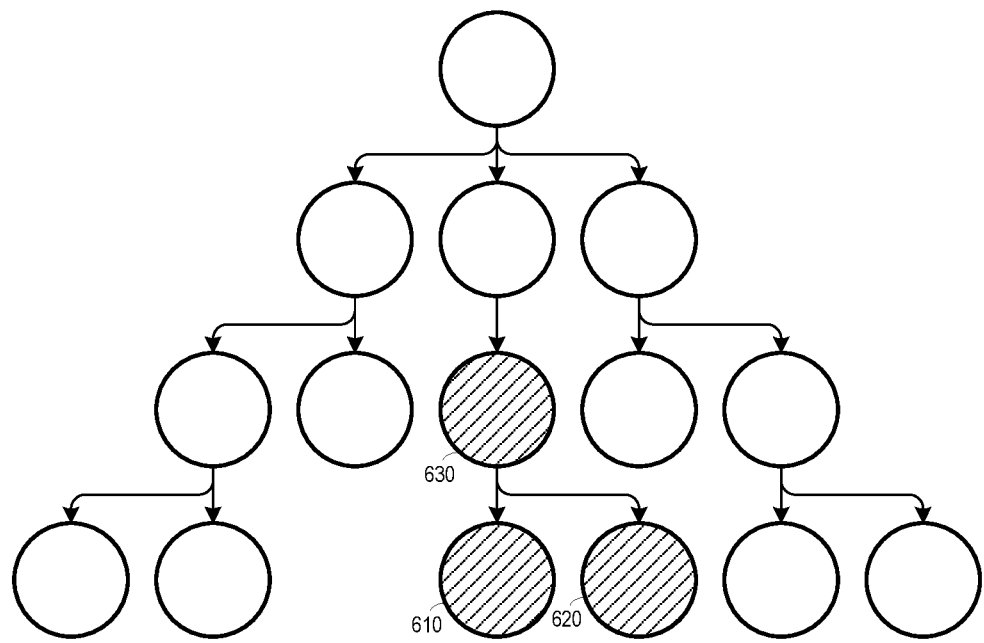

Process 500 may be executed for each node of a component's state tree. FIG. 6C illustrates completion of process 500 with respect to nodes 610 and 620, where shaded nodes represent immutable portions of the tree and clear nodes represent portions which are still mutable. Due to the refactoring of nodes 610 and 620, and the determination at S530 of process 500, node 630 may now be refactored as shown in FIG. 6D.

During the refactoring process, enforcement of invalid state access may restrict both invalid reads and writes to a given piece of state. Enforcement may be possible through run-time execution and/or build-time automation and for subsets of component state trees. After detecting invalid state access, the application can, for example, throw an exception or log a message. This functionality can be disabled in production so as to be only visible to developers.

Object deep freezing can also be applied to allow state modification only through a designated API. This approach is useful if invalid state reads cannot be fully enforced, but invalid state writes can be fully enforced.

Some embodiments may therefore allow migration of a large and complex application to an architecture exhibiting good state management in a flexible manner. Embodiments may support incremental migration of the application, starting from leaves of the component state tree and working upwards, creating a partially immutable model in the interim, until an immutable model is achieved. Access enforcement is applied to subsets of the state tree with potentially different levels of strictness for different pieces of state, in order to prevent regression to poor state management. At any point in time, the code base can be classified into a portion that has been refactored to exhibit good state management, and a portion that has not been refactored, while maintaining existing functionality and continued development in the same code base.

Figure 11:
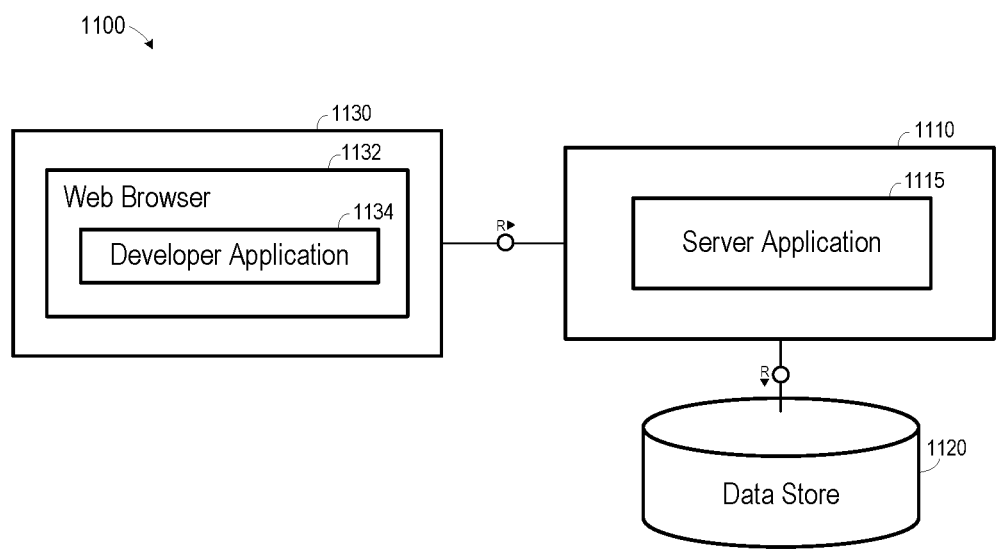
FIG. 11 is a block diagram of a system to develop an application having a partially immutable component state model according to some embodiments.

FIG. 11 illustrates development system 1100 according to some embodiments. Development system 1100 may execute process 500 and/or any other processes described herein to refactor a component state tree according to some embodiments. Development server 1110 provides development of server application 1115, which may be refactored to exhibit a partially immutable model. Server 1100 and/or data store 1120 may be cloud-based and functional components thereof may be implemented using on-demand virtual machines, virtual servers and cloud storage instances. Such cloud-based components may be connected to the Internet and/or to any network or combinations of networks. A cloud can include a wide area network (WAN) such as the public Internet or a private network, and may include a local area network (LAN) within an organization.

Development system 1130 may execute a Web browser 1132 which in turn executes developer application 1134. Developer application 1134 may comprise an integrated development environment to assist in the refactoring of server application 1115 as described herein. A developer operating development system 1130 may be responsible for particular components of server application 1115 and may refactor only those particular components, perhaps based on instructions received from developers of other components.

Figure 12:
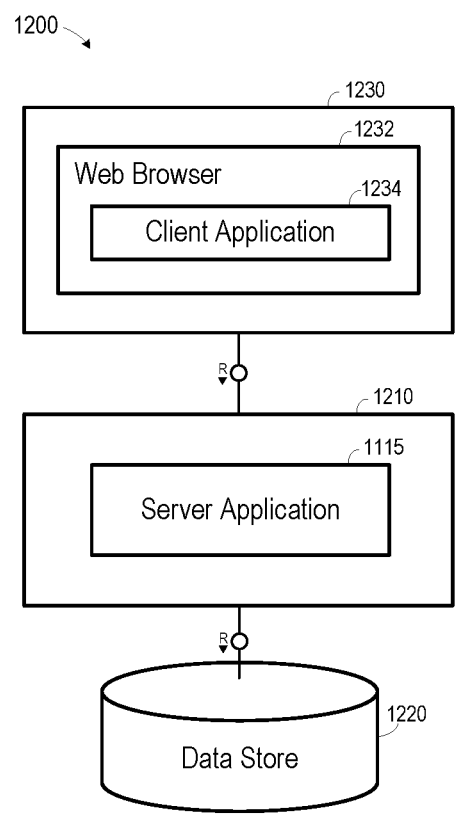
FIG. 12 is a block diagram of a runtime system executing an application having a partially immutable component state model according to some embodiments.

FIG. 12 depicts runtime system 1200 for execution of server application 1115. Server application 1115 is executed by production server 1210, which may or may not comprise a node in a distributed database system including multiple server nodes. Generally, server 1210 may receive a query from client application 1234 executing in web browser 1234 of user computing system 1230 and return results thereto based on data stored within data store 1220. As described above, server application 1115 may provide desired functionality even if only a portion of application 1115 has been refactored as described herein.

Figure 13:
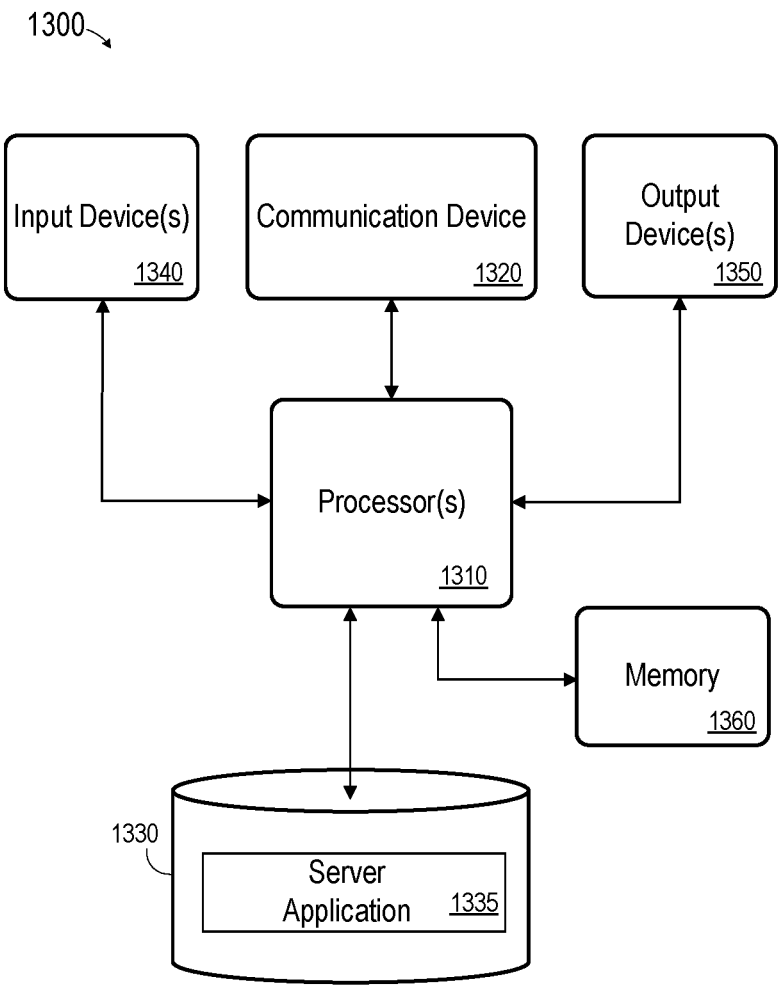
FIG. 13 is a block diagram of a computing system according to some embodiments.

FIG. 13 is a block diagram of server node 1300 according to some embodiments. Server node 1300 may comprise a general-purpose computing apparatus and may execute program code to perform any of the functions described herein. Server node 1300 may comprise an implementation of server 1110 or 1210 in some embodiments. Server node 1300 may include other unshown elements according to some embodiments.

Server node 1300 includes processor(s) 1310 operatively coupled to communication device 1320, data storage device 1330, one or more input devices 1340, one or more output devices 1350 and memory 1360. Communication device 1320 may facilitate communication with external devices, such as a client device or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM).

Server application 1335 may comprise program code executed by processor(s) 1310 to cause server 1300 to execute any desired functionality. As described above, server application 1335 may comprise a code base conforming to a partially or fully immutable model according to some embodiments. Embodiments are not limited to execution of these processes by a single computing device.

Data storage device 1330 may also store data and other program code for providing additional functionality and/or which are necessary for operation of server node 1300, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
    a memory storing processor-executable program code; and
    a processor to execute the processor-executable program code in order to cause the system to:
        determine a component state tree of an application;
        determine a leaf node of the component state tree;
        determine a consumer component associated with invalid access to a state of the leaf node, wherein the invalid access comprises an access to a prior snapshot of an object; and
        modify the access to the state of the leaf node by the consumer component to enable the consumer component to access a current snapshot of the object, wherein modification of the access to the state of the leaf node comprises:
            creation of a callback to update a pointer of the consumer component, the pointer to directly access the state; and
            passing of the callback to a producer component associated with valid access to the state of the leaf node.

2. A system according to claim 1, wherein the invalid access to the state of the leaf node comprises access which is not through a model application programming interface associated with a producer component of the state of the leaf node.

3. A system according to claim 1, wherein the determination of a consumer component associated with invalid access to the state of the leaf node comprises detection of the consumer component accessing a prior version of the state of the leaf node.

4. A system according to claim 1, the processor to execute the processor-executable program code in order to cause the system to:
    determine a second node of the component state tree;
    determine that all child nodes of the second node have been refactored;
    determine a second consumer component associated with invalid access to a state of the second node; and
    modify the access to the state of the second node by the second consumer component.

5. A system according to claim 1, the processor to execute the processor-executable program code in order to cause the system to:
    consolidate state within the leaf node.

6. A computer-implemented method, comprising:
    determining a component state tree of an application;
    determining a leaf node of the component state tree, where all child nodes of the leaf node have been refactored to comprise an immutable model;
    determining a consumer component associated with invalid access to a state of the leaf node, wherein the invalid access comprises an access to a prior snapshot of an object; and
    modifying the access to the state of the leaf node by the consumer component to enable the consumer component to access a current snapshot of the object, wherein modification of the access to the state of the leaf node comprises:
        creation of a callback to update a pointer of the consumer component, the pointer to directly access the state; and
        passing of the callback to a producer component associated with valid access to the state of the leaf node.

7. A method according to claim 6, wherein the invalid access to the state of the leaf node comprises access which is not through a model application programming interface associated with a producer component associated with the state of the node.

8. A method according to claim 6, wherein the determining the consumer component associated with invalid access to the state of the leaf node comprises detecting the consumer component accessing a prior version of the state of the leaf node.

9. A method according to claim 6, further comprising:
    determining a second node of the component state tree, where all child nodes of the second node have been refactored to comprise a second immutable model;
    determining a second consumer component associated with invalid access to a state of the second node; and
    modifying the access to the state of the second node by the second consumer component.

10. A method according to claim 6, further comprising:
    consolidating state within the leaf node.

11. A development system comprising:
a memory storing a first development application; and
a processor to execute the first development application to:
determine a leaf node of a component state tree of a software application;
determine a consumer component associated with invalid access to a state of the leaf node, wherein the invalid access comprises an access to a prior snapshot of an object; and
modify the access to the state of the leaf node by the consumer component to enable the consumer component to access a current snapshot of the object, wherein modification of the access to the state of the leaf node comprises:
creation of a callback to update a pointer of the consumer component, the pointer to directly access the state; and
passing of the callback to a producer component associated with valid access to the state of the leaf node.

12. A system according to claim 11, wherein the invalid access to the state of the leaf node comprises access which is not through a model application programming interface associated with a producer component associated with the state of the leaf node.

13. A system according to claim 11, wherein the determination of the consumer component associated with invalid access to the state of the leaf node comprises detecting access by the consumer component of a prior version of the state of the leaf node.

14. A system according to claim 11, further comprising a second development application to:
determine a second node of the component state tree, where all child nodes of the second node have been refactored to comprise a second immutable model;
determine a second consumer component associated with invalid access to a state of the second node; and
modify the access to the state of the second node by the second consumer component.

15. A system according to claim 11, the first development application to: consolidate state within the leaf node.

* * * * *